(12) United States Patent
Ezell

(10) Patent No.: US 11,375,049 B2
(45) Date of Patent: Jun. 28, 2022

(54) EVENT-BASED MULTIPROTOCOL COMMUNICATION SESSION DISTRIBUTION

(71) Applicant: Avaya Inc., Santa Clara, CA (US)

(72) Inventor: Joel Ezell, Broomfield, CO (US)

(73) Assignee: Avaya Inc., Santa Clara, CA (US)

(*) Notice: Subject to any disclaimer, the term of this patent is extended or adjusted under 35 U.S.C. 154(b) by 5 days.

(21) Appl. No.: 16/249,521

(22) Filed: Jan. 16, 2019

(65) Prior Publication Data
US 2020/0177709 A1 Jun. 4, 2020

Related U.S. Application Data

(60) Provisional application No. 62/773,107, filed on Nov. 29, 2018.

(51) Int. Cl.
*G06F 15/16* (2006.01)
*H04L 69/18* (2022.01)
(Continued)

(52) U.S. Cl.
CPC .......... *H04L 69/18* (2013.01); *H04L 65/1006* (2013.01); *H04L 65/1069* (2013.01)

(58) Field of Classification Search
CPC .. H04L 69/18; H04L 65/1006; H04L 65/1069
See application file for complete search history.

(56) References Cited

U.S. PATENT DOCUMENTS

| 6,490,278 B1 * | 12/2002 | Michelson | H04L 29/06 370/389 |
| 7,551,608 B1 * | 6/2009 | Roy | H04L 29/06027 370/352 |

(Continued)

FOREIGN PATENT DOCUMENTS

| CN | 1567292 | 1/2005 |
| CN | 1567898 | 1/2005 |

(Continued)

OTHER PUBLICATIONS

Rosenberg et al. "SIP: Session Initiation Protocol," Network Working Group, Jun. 2002, RFC 3261, 269 pages.
(Continued)

*Primary Examiner* — David R Lazaro
(74) *Attorney, Agent, or Firm* — Sheridan Ross P.C.

(57) ABSTRACT

To allow the multiple communication endpoints that support different protocols to communicate, a protocol specific message (e.g., a SIP INVITE message) is converted to a protocol neutral message and sent to a protocol neutral bus. The bus delivers this message to a session processing engine, which then applies one or more rules to the protocol neutral request for the first communication session message. The rules are used to apply communication application logic to the first communication session message, then generate a first offer for a communication session message. This message is published to the protocol neutral bus. One or more edge servers supporting one or more protocols may receive that first offer message. The protocol neutral message is converted, by each edge server recipient of that message, to a protocol specific message (e.g., in a different protocol) and is then sent to one or more communication endpoints.

20 Claims, 5 Drawing Sheets

(51) Int. Cl.
   *H04L 65/10*     (2022.01)
   *H04L 65/1069*   (2022.01)

(56) References Cited

U.S. PATENT DOCUMENTS

| | | | | |
|---|---|---|---|---|
| 8,135,759 B2* | 3/2012 | Roy | ............ | H04L 51/066 |
| | | | | 707/812 |
| 8,711,837 B1* | 4/2014 | Sapp | ............ | H04W 4/50 |
| | | | | 370/351 |
| 9,948,740 B1* | 4/2018 | Benson | ............ | H04L 67/2842 |
| 2002/0187777 A1* | 12/2002 | Osterhout | ............ | H04M 3/54 |
| | | | | 455/417 |
| 2005/0030939 A1* | 2/2005 | Roy | ............ | H04L 51/066 |
| | | | | 370/352 |
| 2005/0097222 A1 | 5/2005 | Jiang et al. | | |
| 2005/0152336 A1 | 7/2005 | Bratt et al. | | |
| 2006/0146792 A1* | 7/2006 | Ramachandran | ... | H04L 45/3065 |
| | | | | 370/352 |
| 2006/0165043 A1* | 7/2006 | Yoon | ............ | H04L 29/06027 |
| | | | | 370/346 |
| 2007/0019545 A1* | 1/2007 | Alt | ............ | H04L 29/125 |
| | | | | 370/230 |
| 2007/0019622 A1* | 1/2007 | Alt | ............ | H04L 61/2578 |
| | | | | 370/352 |
| 2007/0022289 A1* | 1/2007 | Alt | ............ | H04L 63/029 |
| | | | | 713/168 |
| 2007/0027985 A1* | 2/2007 | Ramany | ............ | H04L 67/125 |
| | | | | 709/224 |
| 2007/0092073 A1* | 4/2007 | Olshansky | ............ | H04M 3/546 |
| | | | | 379/232 |
| 2007/0094691 A1* | 4/2007 | Gazdzinski | ............ | H04N 21/4126 |
| | | | | 725/62 |
| 2007/0100910 A1* | 5/2007 | Gole | ............ | G06F 11/2079 |
| 2008/0320148 A1 | 12/2008 | Capuozzo et al. | | |
| 2011/0055412 A1* | 3/2011 | Kongalath | ............ | H04L 65/104 |
| | | | | 709/228 |
| 2011/0125821 A1* | 5/2011 | Roshen | ............ | G06F 9/541 |
| | | | | 709/201 |
| 2012/0113978 A1* | 5/2012 | Cerami | ............ | H04L 65/1069 |
| | | | | 370/352 |
| 2012/0233327 A1* | 9/2012 | Smith | ............ | H04L 65/1006 |
| | | | | 709/225 |
| 2012/0250675 A1* | 10/2012 | Hillis | ............ | H04L 12/66 |
| | | | | 370/352 |
| 2013/0227006 A1* | 8/2013 | Raju | ............ | H04L 67/306 |
| | | | | 709/204 |
| 2013/0291036 A1* | 10/2013 | Yamagishi | ............ | H04N 21/2747 |
| | | | | 725/109 |
| 2014/0108524 A1* | 4/2014 | Good | ............ | H04N 21/2362 |
| | | | | 709/204 |
| 2014/0344328 A1* | 11/2014 | Chakra | ............ | H04L 67/2819 |
| | | | | 709/203 |
| 2015/0229638 A1 | 8/2015 | Loo | | |
| 2016/0072867 A1* | 3/2016 | Bouvet | ............ | H04L 65/1069 |
| | | | | 455/414.4 |
| 2016/0156676 A1* | 6/2016 | Verin | ............ | H04L 65/80 |
| | | | | 709/228 |
| 2017/0134239 A1* | 5/2017 | Mahoney | ............ | H04L 41/12 |
| 2019/0222550 A1* | 7/2019 | Yau | ............ | H04L 51/36 |
| 2020/0177709 A1* | 6/2020 | Ezell | ............ | H04L 65/605 |
| 2020/0382373 A1* | 12/2020 | Mermoud | ............ | H04L 41/0816 |
| 2020/0382553 A1* | 12/2020 | Savalle | ............ | G06N 20/00 |

FOREIGN PATENT DOCUMENTS

| | | |
|---|---|---|
| CN | 1913529 | 2/2007 |
| CN | 101488945 | 7/2009 |
| CN | 105900396 | 8/2015 |
| CN | 105141660 | 12/2015 |
| JP | 2005-301468 | 10/2005 |
| JP | 2009-245313 | 10/2009 |
| JP | 2011-205188 | 10/2011 |

OTHER PUBLICATIONS

Extended Search Report for European Patent Application No. 19211991.5, dated Apr. 23, 2020 8 pages.
Notice of Allowance with English Translation for Japan Patent Application No. 2019-212029, dated Feb. 2, 2021 5 pages.
Official Action for European Patent Application No. 19211991.5, dated Oct. 20, 2021 7 pages.
Official Action (with English translation) for Chinese Patent Application No. 201911195628.0, dated Jan. 26, 2022 21 pages.

* cited by examiner

EVENT-BASED MULTIPROTOCOL COMMUNICATION SESSION DISTRIBUTION

CROSS REFERENCE TO RELATED APPLICATION

The present application claims the benefits of U.S. Provisional Application Ser. No. 62/773,107, filed Nov. 29, 2018, entitled "EVENT-BASED MULTIPROTOCOL CALL DISTRIBUTION", which is incorporated herein by this reference in its entirety.

FIELD

The disclosure relates generally to communication systems and particularly to distribution of communication systems in a multiprotocol environment.

BACKGROUND

In large cloud-based Software as a Service (SaaS) communication solutions, it is desirable to be able to support multiple registered endpoints for a given individual. In addition, it is also desirable to support endpoints that use different protocols to communicate with each other for a large number of individuals. One of the problems that currently arises because of the large number of communication endpoints and protocols is that it becomes difficult to effectively scale a SaaS service.

SUMMARY

These and other needs are addressed by the various embodiments and configurations of the present disclosure. To allow the multiple communication endpoints that support different protocols to communicate, a protocol specific message (e.g., a SIP INVITE message) is converted to a protocol neutral message. For example, the SIP INVITE message is converted to a protocol neutral request for communication session message and sent to a protocol neutral bus. The bus delivers this message to a session processing engine, which then applies one or more rules to the protocol neutral request for the first communication session message. The rules are used to apply communication application logic to the first communication session message, then generate a first offer for a communication session message. This message is published to the protocol neutral bus. One or more edge servers supporting one or more protocols may receive that first offer message. The protocol neutral message is converted, by each edge server recipient of that message, to a protocol specific message (e.g., in a different protocol) and is then sent to one or more communication endpoints. This allows for the solution to support multiple communication endpoints that use multiple protocols.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

In this document, the use of defined SIP messages (e.g., a SIP INVITE, a SIP INVITE with replaces header, a SIP JOIN, a SIP REGISTER, a SIP 200 OK, a SIP SUBSCRIBE, a SIP NOTIFY etc.) are being used according to the current SIP standards. Thus, one of skill in the art of SIP would clearly understand that different defined SIP messages cannot be freely interchanged with each other because this would violate the current SIP standards. For example, a SIP INVITE (used to establish a communication session) cannot be substituted for a SIP INVITE with replaces header message (used to replace a dialog (i.e., a call leg) in a SIP communication session) because these messages are designed for different purposes according to the SIP standards.

As described herein and in the claims, "protocol specific" refers to protocols that are used to establish a communication session/media channel where at least one user communication endpoint is typically involved. For example, a user communication session may be a voice communication session (i.e., a voice call), a video communication session, a multimedia communication session, a virtual reality communication session, an Instant Messaging (IM) communication session, an email communication session, a text messaging communication session, a file transfer, and/or the like. "Protocol specific messages may use protocols, such as SIP, WebRTC, Hyper Text Transport (HTTP), H.323, video communication protocols, IM communication protocols, File Transfer Protocol (FTP), Simple Mail Transfer Protocol (SMTP), Short Message Service (SMP), and/or the like. For example, a protocol specific message may be a SIP INVITE message, an FTP message, an H.323 Open Logical Channel (OLC) message, A H.264 message, a Session Description Protocol (SDP) message, and/or the like.

As described herein an in the claims, "protocol" does not refer to lower layer protocols, such as, physical layer protocols (e.g., Bluetooth, Ethernet, etc.), data link layer protocols (e.g., 802.3, 802.11, etc.), network layer protocols (e.g., Internet Protocol (IP), etc.), transport layer protocols (e.g., User Datagram Protocol, Transmission Control Protocol (TCP), encryption protocols, compression protocols, and/or the like.

As described herein "protocol neutral" refers to a message that does not identify a "protocol specific" message (i.e., is protocol independent), but instead generically identifies a particular function, such as to request to establish a communication session. Thus, a "protocol neutral" message may be used may represent multiple messages in different protocols. For example, a request for communication message may be sent in place a SIP INVITE message, a H.323 Open Logical Channel (OLC) message, or the like.

The term "means" as used herein shall be given its broadest possible interpretation in accordance with 35 Section 112(f) and/or Section 112, Paragraph 6. Accordingly, a claim incorporating the term "means" shall cover all structures, material s, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
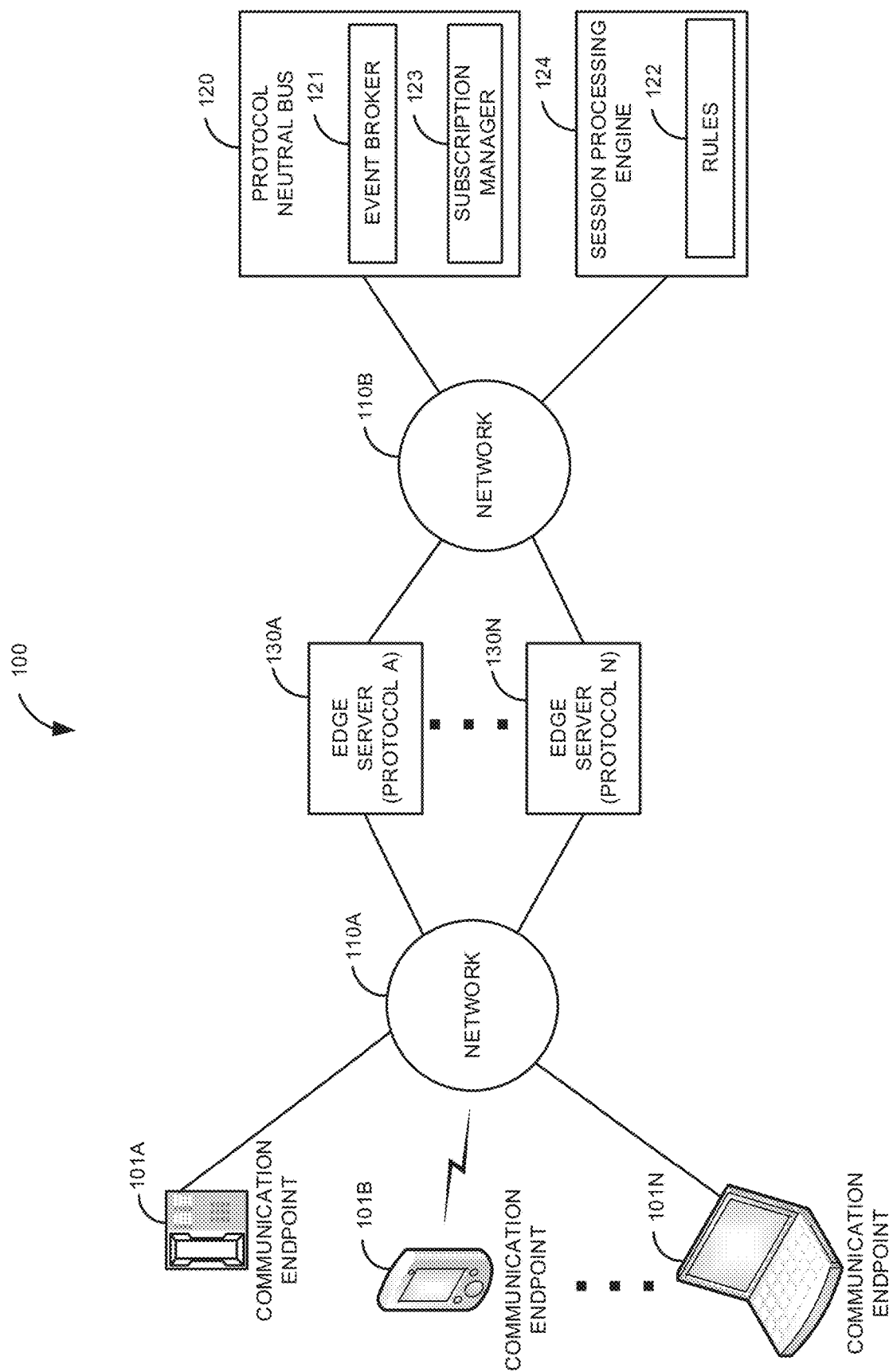
FIG. 1 is a block diagram of a first illustrative system for event-based multiprotocol communication session distribution.

FIG. 1 is a block diagram of a first illustrative system 100 for event-based multiprotocol communication session distribution. The first illustrative system 100 comprises communication endpoints 101A-101N, networks 110A-110B, a protocol neutral bus 120, a session processing engine 124, and edge servers 130A-130N.

The communication endpoints 101A-101N can be or may include any communication endpoint device that can communicate on the network 110, such as a Personal Computer (PC), a telephone, a video system, a voice conferencing system, a cellular telephone, a Personal Digital Assistant (PDA), a tablet device, a notebook device, a web server, a media server, a smartphone, and/or the like. The communication endpoints 101A-101N are devices where a communication sessions ends. The communication endpoints 101A-101N are not network elements that facilitate and/or relay a communication session in the network, such as a communication manager or router. As shown in FIG. 1, any number of communication endpoints 101A-101N may be connected to the network 110.

The networks 110A-110B can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110A-110B can use a variety of electronic protocols, such as Ethernet, Internet Protocol (IP), Session Initiation Protocol (SIP), Integrated Services Digital Network (ISDN), H.323, WebRTC, Hyper Text Transport Protocol (HTTP), video protocols, Instant Messaging (IM) protocols, email protocols, text messaging protocols, file transfer protocols, and/or the like. Thus, the networks 110A-110B are electronic communication networks configured to carry messages via packets and/or circuit switched communications.

The protocol neutral bus 120 can be or may include any hardware coupled with firmware/software that can broker events/messages between the edge servers 130A-130N. For example, the protocol neutral bus 120 may be a Java Message Service (JMS), an Apache Kafka service, and/or the like. The protocol neutral bus 120 is an event service that can pass different events/messages between the edge servers 130A-130N without having to know the underlying protocol of the events/messages. The protocol neutral bus 120 further comprises an event broker 121, and a subscription manager 123.

The event broker 121 can be or may include any hardware coupled with firmware/software that can manage the brokering of protocol neutral events/messages between the edge servers 130A-130N. The event broker 121 works in conjunction with the subscription manager 123 to broker protocol neutral events/messages between the edge servers 130A-130N.

The subscription manager 123 can be or may include any software that allows the edge servers 130A-130N to subscribe to events of the event broker 121. The subscription manager 123 may receive subscription messages to be notified of specific events from an edge server 130. For example, the edge server 130A may subscribe, using the subscription manager 123, to receive requests for all communication sessions with a specific Uniform Resource Identifier (URI).

The session processing engine 124 can be or may include any software that can manage events that are received from the event broker 121 and then apply the rules 122 in order to determine how to manage events associated with a communication session. For example, the session processing engine 124 can use different rules 122 to cause an event/message to be sent to a specific edge server 130. Although the session processing engine 124 is shown as a single element, the session processing engine 124 may be distributed. For example, the session processing engine 124 may be distributed between different elements in the network 110B.

The rules 122 can be or may include any rules 122 that manage communication sessions and associated information. The rules 122 may be global rules. For example, the rules 122 may be rules for a corporation or enterprise. The rules 122 may include rules for a specific user, a specific communication endpoint 101, a specific group (e.g., the engineering group), and/or the like. In one embodiment, the rules 122 may be distributed. For example, corporate/enterprise rules 122 may reside in the protocol neutral bus 120 and rules 122 for individual users/communication endpoints 101 may reside in one or more of the edge servers 130. The rule(s) 122 can be applied in a protocol neutral manner.

The edge servers 130A-130N can be or may include any hardware coupled with firmware/software that can send/receive messages that are protocol specific and then send/receive the messages to/from the protocol neutral bus 120 as protocol neutral messages. In FIG. 1, the edge server 130A supports protocol A and the edge server 130N supports protocol N. For example, the edge server 130A may support SIP and the edge server 130N may support H.323.

In FIG. 1, the edge servers 130A-130N are shown as only supporting a single protocol. However, in one embodiment, one or more of the edge servers 130A-130N may support multiple protocols. For example, the edge server 130A may support both SIP and SDP.

Each edge server 130A-130N support one or more communication endpoints 101. A communication endpoint 101 may register with an edge server 130 based on a particular protocol. For example, the communication endpoints 101A-101B (SIP communication endpoints) may register with the edge server 130A (a SIP edge server) and the communication endpoint 101N (a H.323 communication endpoint) may register with the edge server 130N (a H.323 edge server).

Figure 2:
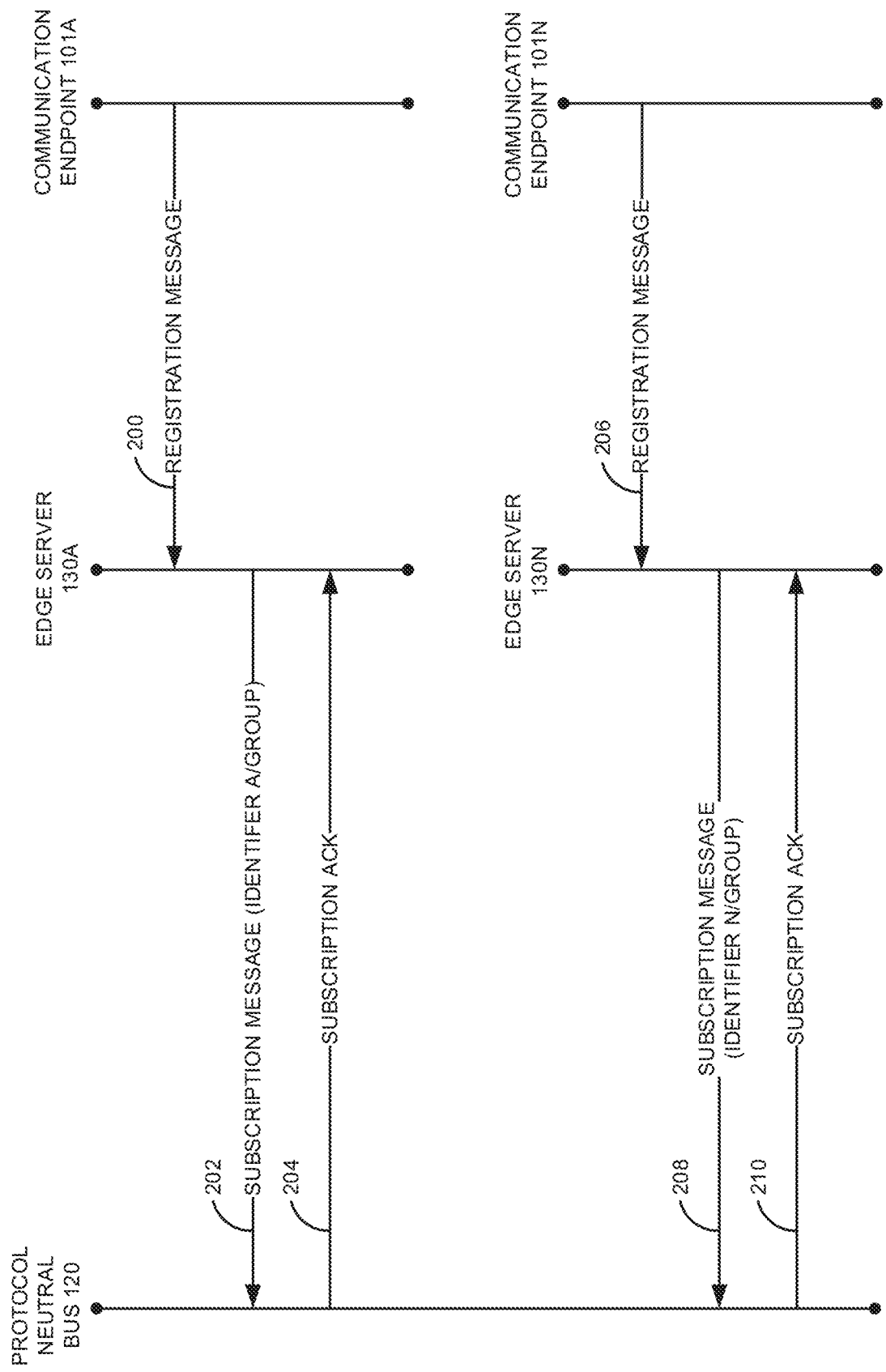
FIG. 2 is a flow diagram of a subscription process for an edge server.

FIG. 2 is a flow diagram of a subscription process for the edge server 130. Illustratively, the communication endpoints 101A-101N, the protocol neutral bus 120, the event broker 121, the subscription manager 123, the session processing engine 124, and the edge servers 130A-130N are stored-program-controlled entities, such as a computer or microprocessor, which performs the method of FIGS. 2-5 and the processes described herein by executing program instructions stored in a computer readable storage medium, such as a memory (i.e., a computer memory, a hard disk, and/or the like). Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process of FIG. 2 allows an edge server 130 to subscribe to receive protocol neutral events/messages from the protocol neutral bus 120. When a communication session is initiated (e.g., by the communication endpoint 101A sending a SIP INVITE message), the edge server 130A (a SIP edge server 130A in this example) converts the SIP INVITE (a protocol specific message) to a protocol neutral message (a request for a communication session message) that is sent to the protocol neutral bus 120. The subscription process described in FIG. 2 allows the event broker 121 to be able to send an offer for a communication session message to the appropriate edge server 130 that has subscribed to receive the event/message.

The process starts when the communication endpoint 101A sends a registration message 200 to register with the edge server 130A. For example, the communication endpoint 101A may be a SIP communication endpoint 101A that registers with the edge server 130A (one that supports SIP) when the SIP communication endpoint 101A powers up. In response to receiving the registration message of step 200, the edge server 130A sends, in step 202, a subscription message to the protocol neutral bus 120 (i.e., the subscription manager 123). The subscription message of step 202 has one or more identifier(s) that that are used by the session processing engine 124 to send, via the protocol neutral bus 120, messages/events to the edge server 130A which supports SIP in this example); the events/messages are ultimately sent as protocol specific messages (SIP) to a communication endpoint 101. The subscription manager 123 acknowledges the subscription message of step 202 in step 204. In one embodiment, the subscription message of step 202 may be a Message Queuing Telemetry Transport (MQTT) Subscribe message.

The identifier in the subscription message 202 may identify a communication endpoint 101 (e.g., a telephone number, an IP address, etc.), a user that is associated with one or more communication endpoint(s) 101 (e.g., a URI (e.g., alice@avaya.com)), a group associated with one more communication endpoints 101 (e.g., marketinggroup@avaya.com), and/or the like. In one embodiment, the identifier may comprise multiple identifiers. For example, the subscription message of step 202 may be used to subscribe for events for multiple telephone numbers, URIs, group identifiers, and/or the like of one or more users. For example, the subscription message of step 202 may be used by the edge server 130A to register hundreds of users/communication endpoints 101.

To illustrate, consider the following example. A user (Alice) has two SIP communication endpoints 101A-101B (a desktop telephone 101A and a mobile telephone 101B). The SIP communication endpoint 101A has a telephone number of 111-222-3333 and the SIP communication endpoint 101B has a telephone number of 444-555-6666. In addition, the user Alice has a URI (alice@avaya.com) that is associated with both the SIP communication endpoints 101A-101B. In this example, the subscription message of step 202 includes all three of the identifiers 111-222-3333, 444-555-6666, and alice@avaya.com. When the session processing engine 124 receives a request, from the protocol neutral bus 120, to establish a communication session with any one of these identifiers, the session processing engine 124, via the protocol neutral bus, based on the received subscription message 202, sends an offer(s) for the communication session message to the edge server 130A. For example, if the request for the communication session message has the identifier 111-222-3333, the session processing engine 124 would send a protocol neutral offer for a communication session message to the edge server 130A based on the subscription message 202.

The communication endpoint 101N, sends, in step 206, a registration message to the edge server 130N (similar to the registration message 200). In response to receiving the registration message of step 206, the edge server 130N sends, in step 208, a subscription message in a similar manner as described above for step 202 to the subscription manager 123. The subscription message of step 208 is then acknowledged by the subscription manager 123 with a subscription acknowledge message in step 210.

In this example, the edge server 130N supports a different protocol (e.g., H.323). The subscription message of step 208 also contains one or more identifiers (e.g., telephone number(s), URI(s), group(s), and/or the like). The identifier(s) of the subscription message of step 208 may be the same and/or different from the identifier(s) of the subscription message of step 202. For example, the subscription message may identify a new telephone number 777-888-9999, a new URI (e.g., bob@avaya.com), and the group (marketinggroup@avaya.com). If the protocol neutral bus 120 receives a request for a communication session message with any of these identifiers, the session processing engine 124, via the event broker 121, will send an offer for a communication session message to the edge server 130N based on the identifier. For example, if the request for a communication session message had the identifier marketinggroup@avaya.com, the offer for the communication session message would be sent to both the edge server 130A and the edge server 130N because both edge servers 130A and 130N subscribed with the identifier marketinggroup@avaya.com. If the request for the communication session message has the identifier 777-888-9999, the offer for the communication session would be sent only to the edge server 130N. The edge server 130N would then create a protocol specific message (i.e., a H.323 Open Logical Channel message) that is sent to the corresponding communication endpoint 101 (i.e., one that has registered with the edge server 130N).

In one embodiment, instead of using the subscription messages 204/208 as described in FIG. 2, the session processing engine 124, when it receives the request for the communication session message, sends a broadcast message with the offer for the communication session with the identifier(s) that can be seen by the edge servers 130A-130N. The edge server(s) 130A-130N that support the particular identifier(s) will then generate the appropriate protocol specific message(s) and send the message(s) to the corresponding communication endpoint(s) 101 that have registered with the edge server 130. In this embodiment, the subscription messages 202/208 may not include the identifier. Instead, the broadcast message contains the identifier and the particular edge server 130A-130N look for broadcast messages that contain specific identifiers.

Figure 3:
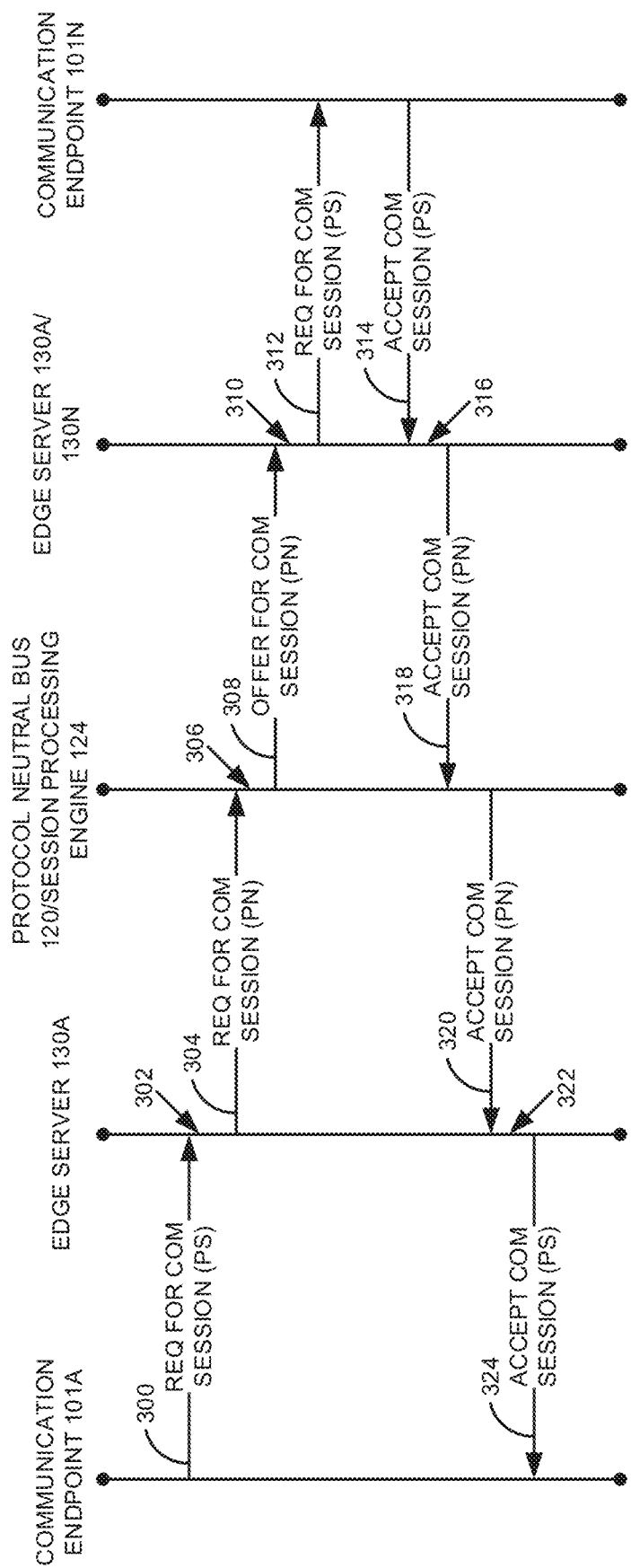
FIG. 3 is a flow diagram of a process for event-based multiprotocol communication session distribution.

FIG. 3 is a flow diagram of a process for event-based multiprotocol communication session distribution. For simplicity, in FIG. 3, the protocol neutral bus 120 and the session processing engine 124 are shown together. However, as shown in FIG. 1, the session processing engine 124 is an entity that is separate from the protocol neutral bus 120. For example, the session processing engine 124, via the network 110B, may access messages/events (e.g., using an Application Programming Interface) that are published by the event broker 121 (those received from the edge servers 130A-130N). The session processing engine 124 (based on rule(s) 122) may in turn send/publish messages/events back to the event broker 121 for sending to the edge servers 130A-130N.

The process starts in step 300 when the communication endpoint 101A sends a request for a communication session message that is protocol specific (a SIP INVITE message in this example) to the edge server 130A (that supports SIP). The edge server 130A converts, in step 302, the SIP INVITE message into a protocol neutral request for a communication session message. The protocol neutral request for communication session message is sent to the session processing engine 124 via the protocol neutral bus 120 in step 304, which is then sent to the session processing engine 124. The session processing engine 124 uses the rules 122, in step 306, to determine how to handle the request for communication session message. For example, based on the identifier(s) in the request for communication message of step 304, the processing engine 124 applies one or more of the rules 122 to determine what to do with the request for communication message of step 304.

The session processing engine 124 sends, via the protocol neutral bus 120, in step 308, based on the rules 122, a protocol neutral offer for the communication session message to the edge server 130A or 130N (only a single edge server 130 in this example) based on the subscription message (e.g., subscription message 202). The edge server 130A or 130N converts, in step 310, the protocol neutral offer for the communication session message into a protocol specific request for a communication session. For example, if the communication endpoint 101N is a SIP communication endpoint that is supported by the edge server 130A, the edge server 130A would convert the protocol neutral offer for the communication session message of step 308 into a SIP INVITE message. Alternatively, if the communication endpoint 101N is an H.323 communication endpoint that is supported by the edge server 130N, the edge server 130N would convert the protocol neutral offer for communication session message of step 308 into a H.323 Open Logical Channel message in step 310. The protocol specific request for the communication session is then sent to the communication endpoint 101N in step 312.

The communication endpoint 101N, sends, in step 314, a protocol specific accept communication session message. For example, if communication endpoint 101N is a SIP communication endpoint, the accept communication message of step 314 may be a SIP 200 OK message, a SIP RINGING message, a SIP TRYING message, or the like. If the communication endpoint 101N is an H.323 communication endpoint, the accept communication message of step 314 may be a H.323 Call Processing message. The edge server 130A or 130N converts the protocol specific message of step 314 into a protocol neutral accept communication session message in step 316, which is then sent to the session processing engine 124, via the protocol neutral bus 120, in step 318. The session processing engine 124 sends, via protocol neutral bus 120, in step 320, the protocol neutral accept communication session message to the edge server 130A (because the destination communication endpoint 101A is SIP based). The edge server 130A converts the accept communication session message of step 320 into a protocol specific message (a SIP 200 OK) in step 322 and sends the SIP 200 OK to the communication endpoint 101A in step 324.

This process is used to send/receive any additional messages necessary to establish the communication session. For example, the communication endpoint 101A, according to the SIP standards, would send a SIP ACK message to the edge server 130A. The SIP ACK message would then be converted to a protocol neutral acknowledgement message by the edge server 130A and sent to the session processing engine 124, via the protocol neutral bus 120. The protocol neutral acknowledgement message is then sent by the session processing engine 124, via the protocol neutral bus 120, to the appropriate edge server 130A/130N. The appropriate edge server 130A/130N would then convert the protocol neutral message to a protocol specific message (SIP or H.323) that is sent to the communication endpoint 101N to establish the communication session. A similar process can also be used to establish the media stream (e.g., a voice call using Session Description Protocol).

One of the main advantages to using a protocol neutral bus 120 and protocol neutral session processing engine 124 is that communication endpoints 101 that are on different sides of a communication session can communicate using different protocols. Since the protocol neutral bus 120/session processing engine 124 does not have to deal with the different protocols that are being used by the communication endpoints 101A-101N, the session processing engine 124 can focus applying the rule(s) 122 and the protocol neutral bus can focus on routing messages without out having to know which protocols are beings used. This allows the system to scale and support a large number of communication endpoints 101-101N that use different protocols. For example, the protocol neutral bus 120/session processing engine 124 may be used to support a cloud-based communication service.

Figure 4:
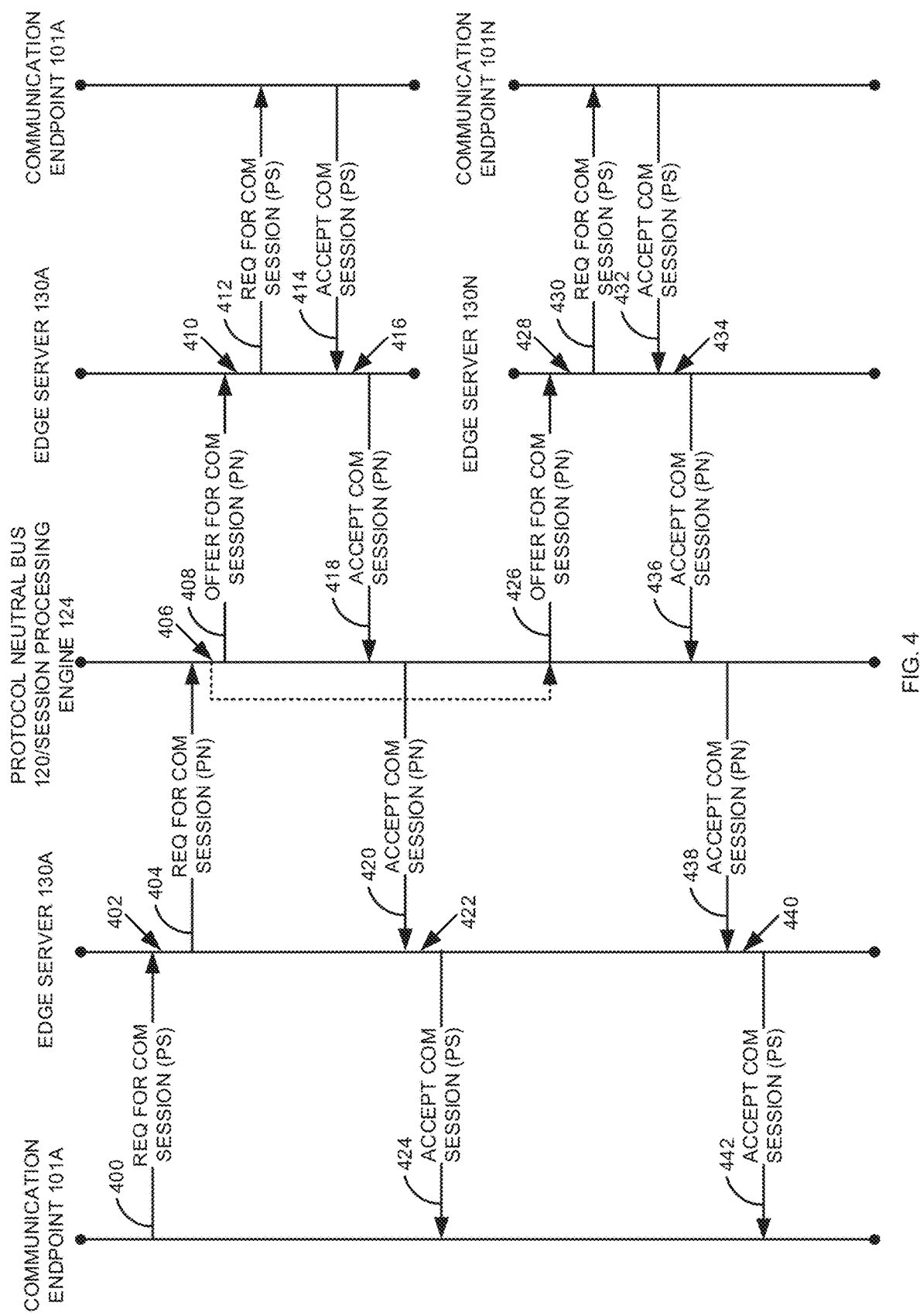
FIG. 4 is a flow diagram of a process for event-based multiprotocol communication session distribution where groups and/or call forking is used.

FIG. 4 is a flow diagram of a process for event-based multiprotocol communication session distribution where groups and/or call forking is used. For simplicity, in FIG. 4 (like in FIG. 3), the protocol neutral bus 120 and the session processing engine 124 are shown together. However, as shown in FIG. 1, the session processing engine 124 is an entity that is separate from the protocol neutral bus 120. The process starts in step 400 when the communication endpoint 101A sends a request for a communication session message that is protocol specific (a SIP INVITE message in this example) to the edge server 130A (that supports SIP). The edge server 130A converts, in step 402, the SIP INVITE message into a protocol neutral request for a communication session message. The protocol neutral request for communication session message is sent to the session processing engine 124, via the protocol neutral bus 120, in step 404.

The session processing engine 124 uses the rules 122, in step 406, to determine how to handle the request for communication session message. For example, the request for communication session message may have the identifier marketinggroup@avaya.com. In this example, both the edge servers 130A and 130N subscribed to receive events/messages based on the group identifier marketinggroup@avaya.com. As a result, the session processing engine 124 sends, to the protocol neutral bus 120, a protocol neutral offer for the communication session message. Based on a subscription (e.g., step 202), the protocol neutral bus 120 sends the protocol neutral offer for the communication session message to the edge server 130A that subscribed to receive the offer for the communication session message.

The edge server 130A converts, in step 410, the protocol neutral offer for the communication session message into a protocol specific request for a communication session (a SIP INVITE message). The protocol specific request for the communication session (the SIP INVITE message) is then sent to the communication endpoint 101N in step 412.

The communication endpoint 101N, sends, in step 414, a protocol specific accept communication session message (e.g., a SIP 200 OK message). The edge server 130A converts the protocol specific message of step 414 into a protocol neutral accept communication session message in step 416, which is then sent to the session processing engine 124, via the protocol neutral bus 120 in step 418. The session processing engine 124 sends, via protocol neutral bus 120, in step 420, the protocol neutral accept communication session message to the edge server 130A (because the destination communication endpoint 101A is SIP based). The edge server 130A converts the accept communication session message of step 320 into a protocol specific message (a SIP 200 OK) in step 422 and sends the SIP 200 OK to the communication endpoint 101A in step 424.

In addition, based on step 406 (because of the group identifier marketinggroup@avaya.com), the event broker 121 sends, via the protocol neutral bus 120, in step 426, a protocol neutral offer for the communication session message to the edge server 130N based on the subscription message of step 208. The edge server 130N converts, in step 428, the protocol neutral offer for the communication session message into a protocol specific request for a communication session (e.g., an H.323 Open Logical Channel message). The protocol specific request for the communication session (the H.323 Open Logical Channel message) is then sent to the communication endpoint 101N in step 430.

The communication endpoint 101N, sends, in step 432, a protocol specific accept communication session message (e.g., a H.323 Call Processing message). The edge server 130N converts the protocol specific message of step 432 into a protocol neutral accept communication session message in step 434, which is then sent to the session processing engine 124, via the protocol neutral bus 120, in step 436. The session processing engine 124 sends, via the protocol neutral bus 120, in step 438, the protocol neutral accept communication session message to the edge server 130A (because the destination communication endpoint 101A is SIP based). The edge server 130A converts the accept communication session message of step 438 into a protocol specific message (a SIP 200 OK) in step 440 and sends the SIP 200 OK to the communication endpoint 101A in step 424. For example, the communication endpoint 101 may be a conferencing server where the communication endpoints 101A and 101N are conferenced into a conferencing session.

In addition the process of FIG. 4 may be used to create call forking for communications to an individual user's identifier For example, where an offer for a communication is sent by the protocol neutral bus 120 to multiple communication endpoints 101A-101N, where multiple edge servers 130A-130N have subscribed (e.g., as described in FIG. 2) using the same identifier. For instance, multiple edge servers 130A-130N have subscribed for events/messages associated with the telephone number 111-222-3333.

Figure 5:
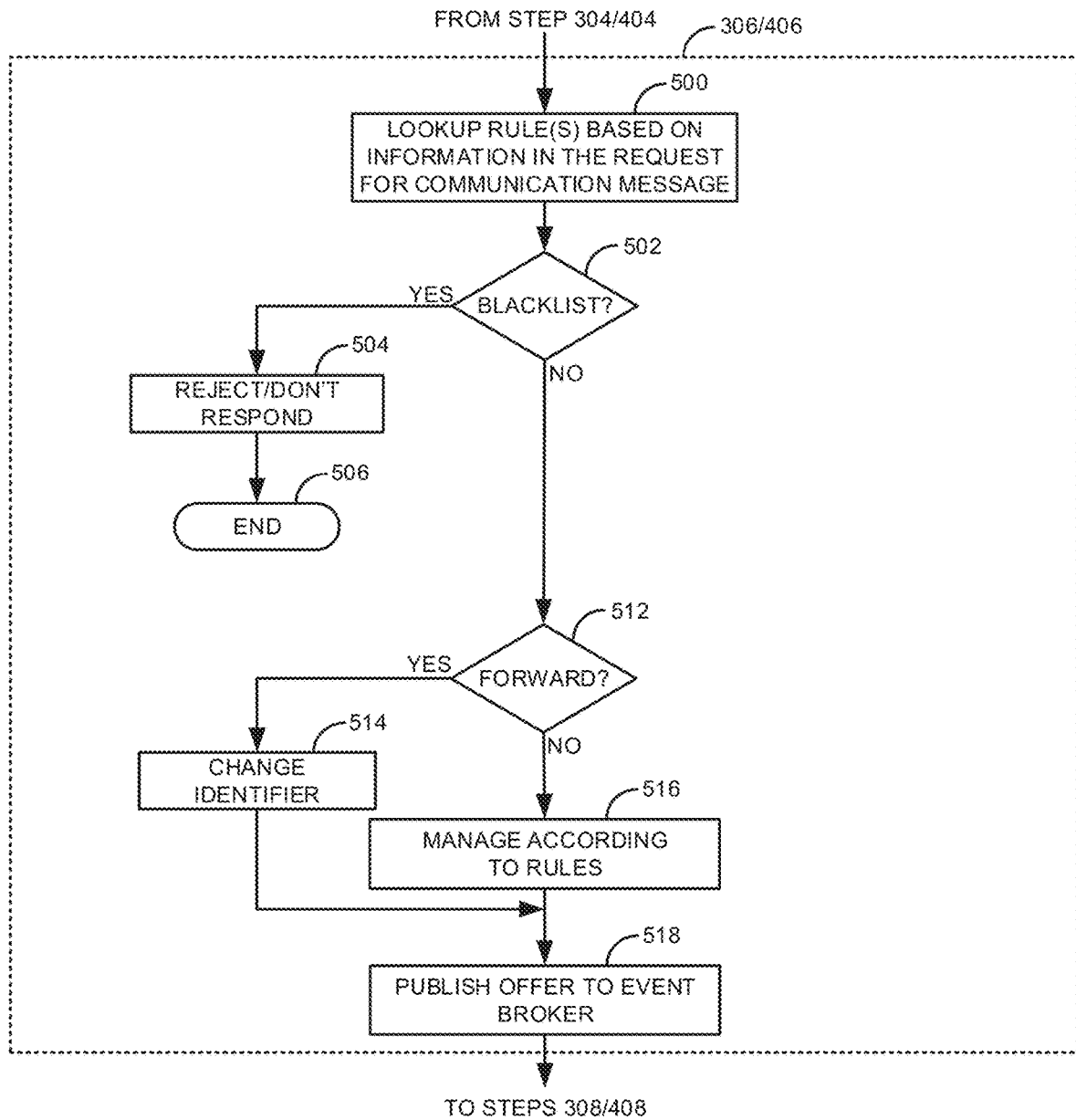
FIG. 5 is a flow diagram of a process for applying rules to distribute multiprotocol communication sessions.

FIG. 5 is a flow diagram of a process for applying rules 122 to distribute multiprotocol communication sessions. The process of FIG. 5 may be used in addition to the subscription process of FIG. 2. For example, the process described in FIG. 5 may be based on user/enterprise rules 122. The process of FIG. 5 is an exemplary embodiment of steps 306/406 of FIGS. 3-4.

After step 304 or 404, the session processing engine 124 looks up the rules 122 based on information in the request for communication message in step 500. The protocol neutral bus 120 determines, in step 502, if the party requesting the communication session/communication endpoint 101 has been blacklisted. If the requesting party has been blacklisted in step 502, the session processing engine 124 rejects the message in step 504. For example, the rejection may be based on the session processing engine 124 not sending the offer for the communication session in step 308/408.

If the requesting party/communication endpoint 101 has not been blacklisted in step 502, the session processing engine 124 determines, in step 512, if the rule 122 is to forward a communication session. For example, the user set of the communication endpoint 101A has enabled call forwarding. If forwarding is being used, the session processing engine 124 changes, in step 514, the identifier (e.g., a telephone number) to the communication endpoint 101 to receive the request for communication session message to see if there are any edge servers 130 that have registered for the new identifier. The process then goes to step 518.

Otherwise, if forwarding is not enabled in step 512, the session processing engine 124 manages, in step 516, according to what rules 122 have been defined by the user/enterprise. For example, a call recording application may be added to the communication session based on the rules 122. The session processing engine 124 then publishes the offer to the event broker 121 in step 518. For example, the rules 122 may define that an administered forking takes preference over a forking based on registrations. The process then goes to step 308/408.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network 110, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer-readable medium coupled with the microprocessor and comprising microprocessor-readable and -executable instructions that, when executed by the microprocessor, cause the microprocessor to:
receive a first request for a first communication session message, wherein the first request is protocol-neutral and was converted from a first protocol-specific message, the first request comprising an identifier, wherein the identifier is associated with one or more of a uniform resource identifier, a telephone number, and an IP address;
identify one or more rules based on the identifier in the first request;
apply the identified one or more rules to the first request; and
send, based on the identified one or more rules, a first offer for the first communication session message to a first edge server via a protocol-neutral bus, wherein the first offer is protocol-neutral and is converted by the first edge server to a second protocol-specific message.

2. The system of claim 1, wherein the microprocessor-readable and -executable instructions further cause the microprocessor to:
receive an accept communication session message for a first communication session, wherein the accept communication session message for the first communication session is protocol-neutral; and
send the accept communication session message for the first communication session to the first edge server.

3. The system of claim 2, wherein the accept communication session message for the first communication session was converted from a third protocol-specific message and is converted by the first edge server to a fourth protocol-specific message.

4. The system of claim 1, wherein the first protocol-specific message and the second protocol-specific message use a same protocol.

5. The system of claim 1, wherein the first protocol-specific message and the second protocol-specific message use different protocols.

6. The system of claim 1, wherein the identifier in the first request is associated with a user and wherein the microprocessor-readable and -executable instructions further cause the microprocessor to:
send the first offer for the first communication session message to a second edge server based on a subscription message.

7. The system of claim 1, wherein the identifier is further associated with at least one of a plurality of user communication endpoints and a plurality of users, and wherein the first offer for the first communication session message comprises the identifier.

8. The system of claim 1 wherein a subscription message sent from the first edge server comprises the identifier, wherein the first offer is sent to the first edge server based on the subscription message.

9. The system of claim 1, wherein the microprocessor-readable and -executable instructions further cause the microprocessor to:
receive, from a plurality of edge servers, a plurality of subscription messages, wherein the plurality of subscription messages identifies a group of users and wherein the first offer is sent to the plurality of edge servers based on the identified group of users.

10. The system of claim 1, wherein the microprocessor-readable and -executable instructions further cause the microprocessor to:
receive a second request for a second communication session message, wherein the second request is protocol-neutral;
apply the one or more rules to the second request for the second communication session message, wherein the one or more rules are used to send a second offer for the second communication session message to a second edge server that supports a second protocol; and
send the second offer to the second edge server, via a second protocol-neutral bus, based on the applied one or more rules, wherein the second offer is protocol-neutral.

11. A method comprising:
receiving, by a microprocessor, a first request for a first communication session message, wherein the first request is protocol-neutral and was converted from a first protocol-specific message, the first request comprising an identifier, wherein the identifier is associated with one or more of a uniform resource identifier, a telephone number, and an IP address;
identifying, by the microprocessor, one or more rules based on the identifier in the first request;
applying, by the microprocessor, the identified one or more rules to the first request; and
sending, based on the identified one or more rules, by the microprocessor, a first offer for the first communication session message to a first edge server via a protocol-neutral bus, wherein the first offer is protocol-neutral and is converted by the first edge server to a second protocol-specific message.

12. The method of claim 11, further comprising:
receiving, by the microprocessor, an accept communication session message for a first communication session, wherein the accept communication session message is protocol-neutral; and
sending, by the microprocessor, the accept communication session message for the first communication session to the first edge server.

13. The method of claim 12, wherein the accept communication session message was converted from a third protocol-specific message and is converted by the first edge server to a fourth protocol-specific message.

14. The method of claim 13, wherein the first protocol-specific message and the second protocol-specific message use a same protocol.

15. The method of claim 11, wherein the identifier is further associated with at least one of a plurality of user communication endpoints and a plurality of users, and wherein the first offer for the first communication session message comprises the identifier.

16. The method of claim 11, wherein a subscription message sent from the first edge server comprises the identifier, wherein the first offer is sent to the first edge server based on the subscription message.

17. The method of claim 11, further comprising:
receiving, by the microprocessor, from a plurality of edge servers, a plurality of subscription messages, wherein the plurality of subscription messages identifies a group of users and wherein the first offer is sent to the plurality of edge servers based on the identified group of users.

18. The method of claim 11, further comprising:
receiving, by the microprocessor, a second request for a second communication session message, wherein the second request is protocol-neutral;
applying, by the microprocessor, the one or more rules to the second request, wherein the one or more rules are used to send a second offer for the second communication session message to a second edge server that supports a second protocol; and
sending, by the microprocessor, the second offer to the second edge server via a second protocol-neutral bus based on the applied one or more rules, wherein the second offer is protocol-neutral.

19. A non-transitory computer-readable medium having stored thereon instructions that cause a processor to execute a method, the method comprising:
receiving a first request for a first communication session message, wherein the first request is protocol-neutral and was converted from a first protocol-specific message, the first request comprising an identifier, wherein the identifier is associated with one or more of a uniform resource identifier, a telephone number, and an IP address;
identifying one or more rules based on an identifier in the first request;
applying the identified one or more rules to the first request; and
sending, based on the identified one or more rules, a first offer for the first communication session message to a first edge server via a protocol-neutral bus, wherein the first offer is protocol-neutral and is converted by the first edge server to a second protocol-specific message.

20. The medium of claim 19, further comprising:
receiving an accept communication session message for a first communication session, wherein the accept communication session message is protocol-neutral; and sending the accept communication session message for the first communication session to the first edge server.

* * * * *